United States Patent [19]

Kud et al.

[11] Patent Number: 5,217,642
[45] Date of Patent: Jun. 8, 1993

[54] POLYESTER WITH TARTARIC ACID, PREPARATION THEREOF AND USE THEREOF AS DETERGENT ADDITIVES, AND POLYESTERS OF TARTARIC ACID AND TETRACARBOXYLIC ACIDS

[75] Inventors: Alexander Kud, Eppelsheim; Richard Baur, Mutterstadt; Dieter Boeckh; Heinrich Hartmann, both of Limburgerhof, all of Fed. Rep. of Germany

[73] Assignee: BASF Aktiengesellschaft, Ludwigshafen, Fed. Rep. of Germany

[21] Appl. No.: 784,585

[22] Filed: Oct. 29, 1991

[30] Foreign Application Priority Data

Oct. 29, 1990 [DE] Fed. Rep. of Germany ....... 4034334

[51] Int. Cl.$^5$ ............................ C11D 1/00; C11D 3/00
[52] U.S. Cl. ........................ 252/174.23; 252/174.24; 252/DIG. 2; 252/DIG. 15; 528/296; 528/302
[58] Field of Search ................. 252/DIG. 15, 174.23, 252/174.24, DIG. 2; 528/296, 302

[56] References Cited

U.S. PATENT DOCUMENTS

| | | | |
|---|---|---|---|
| 2,416,485 | 2/1947 | Lasher | 260/405 |
| 3,557,039 | 1/1971 | McIntyre et al. | 260/29.2 |
| 4,797,223 | 1/1989 | Amick et al. | 252/174.28 |
| 5,009,805 | 4/1991 | Perner et al. | 252/174.24 |

FOREIGN PATENT DOCUMENTS 0185427 6/1986 European Pat. Off. .
1617122 8/1974 Fed. Rep. of Germany .
1-225623 9/1989 Japan .
1154730 11/1969 United Kingdom .

OTHER PUBLICATIONS

Chemical Abstracts, vol. 98, No. 6, Feb. 7, 1983, Columbus Ohio, US; Abstract No. 36523K, Rabas et al: "Liquid cleaning agent" Seite 107; & CS-B-198461.
Chemical Abstracts, vol. 97, No. 24, Dec. 13, 1982, Columbus, Ohio, US; abstract No. 198736P, Rabas et al: "Condensates of Hydroxycarboxylic Acids with Compounds Containing Hydroxyl or Carboxyl Groups," Seite 12; & CS-B-187709.
Applied Polymer Symposia, Bd. 35, 1979, New York US, Seiten 405–414; M. M. Bitritto et al: "Synthesis and Biodegradation of polymers derived from alfa-hydroxy acids."
Patent Abstracts of Japan, vol. 14, No. 544 4, Dec. 1990 & JP-A-2 232 226 (Taki Chem Co Ltd) 14, Sep. 1990.

*Primary Examiner*—Asok Pal
*Assistant Examiner*—P. Achutamurthy
*Attorney, Agent, or Firm*—Oblon, Spivak, McClelland, Maier & Neustadt

[57] ABSTRACT

Water-soluble or water-dispersible polyesters obtainable by condensation of tartaric acid or derivatives thereof alone or by condensation of mixtures of tartaric acid or derivatives thereof and citric acid with or without alcohols, water-soluble polyalkylene glycols or water-soluble polyaddition products of alkylene oxides with alcohols, fatty acids, alkylphenols or alkylamines and with or without at least dibasic carboxylic acids are suitable for use as detergent additives.

11 Claims, No Drawings

POLYESTER WITH TARTARIC ACID, PREPARATION THEREOF AND USE THEREOF AS DETERGENT ADDITIVES, AND POLYESTERS OF TARTARIC ACID AND TETRACARBOXYLIC ACIDS

The present invention relates to the use of water-soluble or water-dispersible polyesters which are obtainable by condensation of tartaric acid alone or by condensation of mixtures of tartaric acid or anhydride and citric acid with or without alcohols and/or polybasic carboxylic acids as detergent additives, processes for preparing the polyesters, and polyesters which contain tartaric acid and tetracarboxylic acids as cocondensed units.

U.S. Pat. No. 3,557,039 discloses stable aqueous dispersions of polyesters which are preparable by condensing terephthalic acid or dimethyl terephthalate with ethylene glycol and polyethylene glycol. According to GB Patent 1,154,730, additions of polyesters of dimethyl terephthalate, ethylene glycol and polyethylene glycol of molecular weight 1500 act as soil antiredeposition agents in the washing of textile material.

EP Applications 185,427, 241,984, 241,985 and 272,033 disclose polyester condensates of polybasic aromatic carboxylic acids with dihydric alcohols and polyethers capped with $C_1$–$C_4$-alkyl groups at one end. Used in detergents, they promote the detachment of soil from polyester fabrics in washing. Most of the polyesters hitherto described as detergent additives are largely nonionic in nature and not suitable for dispersing polar soil particles and alkaline earth metal salts. The homopolymers and copolymers of, for example, acrylic acid chiefly used for this purpose, however, are not or only very slowly biodegradable. Weakly anionic polyesters as described for example in DE-B-1,617,122 as grayness inhibitors are only very poor dispersants for polar particulate soil and inorganic salts.

It is an object of the present invention to provide dispersing detergent additives which are biodegradable.

We have found that this object is achieved by using water-soluble or water-dispersible polyesters obtainable by condensation of tartaric acid or anhydride alone or by condensation of mixtures of tartaric acid or anhydride and citric acid in a molar ratio of from 1:0.1 to 1:4 as detergent additives. The polyesters can also be prepared by carrying out the condensation of tartaric acid and/or citric acid additionally in the presence of up to 60 mol % of malic acid. The above-stated object is also achieved by using polyesters obtainable by condensing
a) a mixture of tartaric acid or anhydride and citric acid in a molar ratio of from 1:0.1 to 1:4 or such a mixture which additionally contains up to 60 mol % of malic acid with - based on 1 mol of component a)
b) from 0 to 50 mol % of a monohydric or polyhydric alcohol, a water-soluble poly-$C_2$–$C_4$-alkylene glycol or a water-soluble addition product of a $C_2$–$C_4$-alkylene oxide with a monohydric or polyhydric alcohol, a fatty acid, an alkylphenol or an alkylamine, or
c) from 0 to 90 mol % of a carboxylic acid which contains at least two carboxyl groups and which is different from the carboxylic acids mentioned under a), with or without
d) from 0 to 90 mol % of lactic acid, glycolic acid or a mixture thereof
in the presence of a customary esterification catalyst. Such polyesters are obtainable by condensing components a) to d) in the melt in the absence of inert diluents at from 120° to 180° C. in the presence of customary esterification catalysts and distilling off the water formed in the course of the condensation.

The abovementioned object is also achieved by polyesters which are obtainable by condensing
a) from 25 to 75 mol % of tartaric acid, tartaric anhydride or a mixture of tartaric acid or anhydride and citric acid in a molar ratio of from 1:0.1 to 1:4 with
b) from 0 to 50 mol % of a monohydric or polyhydric alcohol, a water-soluble poly-$C_2$–$C_4$-alkylene glycol or a water-soluble addition product of a $C_2$- to $C_4$-alkylene oxide with a monohydric or polyhydric alcohol, a fatty acid, an alkylphenol or an alkylamine, and
c) from 75 to 25 mol % of butanetetracarboxylic acid, cyclopentanetetracarboxylic acid, cyclohexanetetracarboxylic acid, butanetetracarboxylic anhydride, cyclopentanetetracarboxylic anhydride, cyclohexanetetracarboxylic anhydride or a mixture thereof,
at from 120° to 180° C. in the presence of a customary esterification catalyst up to a K value of from 7 to 80 (determined by the method of H. Fikentscher on 2% aqueous solutions of polyester at 25° C. and pH 7).

The addition of the above-described polyesters to detergent formulations promotes the detachment of particulate soil from the textile material being washed and stabilizes the detached soil in the washing liquor. The polyesters described are very highly biodegradable; for example, some products have degradation rates above 95%.

Only some of the polyesters to be used according to the present invention have been described in the literature. For instance, JP-A-87/201,926 discloses condensing hydroxypolycarboxylic acids, such as malic acid, or esters thereof at from 50° to 200° C. and at below 200 mbar. The polymers are used for example as suture material. It is known from Ullmanns Encyklopädie der technischen Chemie, 3rd edition, Urban und Schwarzenberg, Munich-Berlin 1963, 3rd edition, Volume 14, page 82, that polyesters can be prepared by polycondensation of hydroxycarboxylic acids. However, no examples are mentioned.

The tartaric acid polyesters which according to the invention are to be used as detergent additives are prepared for example by heating tartaric acid or anhydride at from 120° to 180° C. in the presence of customary esterification catalysts and distilling the water formed in the course of the condensation out of the reaction mixture. The condensation can also be carried out with mixtures of tartaric acid and tartaric anhydride. It is also possible to form tartaric acid into polyesters in the presence of up to 60, preferably up to 30, mol % of tartaric esters of $C_1$–$C_4$-alcohols. In this case, instead of water, the particular alcohol underlying the esters is removed from the reaction mixture. Examples of tartaric esters are dimethyl tartrate, diethyl tartrate, di-n-propyl tartrate, diisopropyl tartrate and di-n-butyl tartrate. The condensation can of course also be carried out with tartaric esters where only one carboxyl group has been esterified. The condensation of tartaric acid gives rise to structures where either or both OH groups of the tartaric acid have reacted with carboxyl groups on component a, c or d to form polyesters. Reaction products which are particularly suitable for use as detergent additives are also obtained on carrying out the condensation of tartaric acid or derivatives thereof in the presence of citric acid. In this case the molar ratio of tartaric acid, anhydride or ester to citric acid is preferably within the range from 1:0.5 to 1:2. Products having good application properties are also obtained when the above-described condensation of tartaric acid or derivatives thereof in the absence or presence of citric acid is carried out in the presence of up to 60, preferably 30, mol % of malic acid. The use of citric acid and malic acid in the condensation has the advantage that melts of low viscosity are obtained and that condensation is possible at a lower temperature. Moreover, citric acid per se is a better builder for detergents than tartaric acid. Partial hydrolysis of the polycondensates to be used according to the present invention, with the release of citric acid, thus causes less of a drop in activity than in the case of tartaric acid homocondensates.

The above-described polyesters can be modified by cocondensation with further components. For instance, useful detergent additives are obtained by condensing
a) a mixture of tartaric acid or anhydride and citric acid in a molar ratio of from 1:0.1 to 1:4 or such a mixture which additionally contains up to 60 mol % of malic acid, with
b) from 0 to 50 mol % of a monohydric or polyhydric alcohol, a water-soluble poly-$C_2$-$C_4$-alkylene glycol or a water-soluble addition product of a $C_2$-$C_4$-alkylene oxide with a monohydric or polyhydric alcohol, a fatty acid, analkylphenoloran alkylamine, or
c) from 0 to 90 mol % of a carboxylic acid which contains at least two carboxyl groups and is different from the carboxylic acids mentioned under a).

Monohydric alcohols suitable for use as component b) may have from 1 to 22 carbon atoms, eg. methanol, ethanol, n-propanol, isopropanol, n-butanol, sec-butanol, n-hexanol, cyclohexanol, n-octanol, isooctanol, nonanol, palmityl alcohol, stearyl alcohol and also alcohols obtainable by the Ziegler process and by the oxo process. The polyhydric alcohols preferably have from 2 to 6 carbon atoms, such as ethylene glycol, propylene glycol, glycerol, 1,4-butanediol and 1,6-hexanediol. The water-soluble polyalkylene glycols include for example polyethylene glycols having molecular weights of from 106 to 60,000, ie. compounds such as diethylene glycol, triethylene glycol, tetraethylene glycol and polyalkylene glycols having molecular weights of preferably 200–12,000. It is also possible to use polypropylene glycols having molecular weights of from 134 to 800 and also water-soluble polybutylene glycols. This class of compounds also includes copolymers of ethylene oxide and propylene oxide and also copolymers of this type which additionally contain butylene oxide, copolymers of ethylene oxide and butylene oxide, and copolymers of propylene oxide and butylene oxide. In these polymers the alkylene oxide units can be present randomly or in the form of blocks They are still water-soluble for the purposes of the present invention if 2 g of the polyalkylene glycol dissolve in one liter of water. As component b) it is also possible to use water-soluble addition products of $C_2$-$C_4$-alkylene oxicdes with monohydric or polyhydric alcohols. Monohydric and polyhydric alcohols were mentioned earlier. They are reacted either with ethylene oxide alone or with mixtures of ethylene oxide and propylene oxide and optionally in addition butylene oxide. The alkoxylation is carried out under customary reaction conditions in the presence of alkali, such as sodium hydroxide solution, potassium hydroxide solution or calcium hydroxide or calcium oxide, at elevated temperatures The alkylene oxides can be present in the addition products in the form of blocks or in random distribution. Preferably, for use as component b), $C_2$-$C_4$-alcohols are reacted with ethylene oxide and/or propylene oxide. For this reaction from 1 to 80 mol of alkylene oxide is used per mole of alcohol.

As component b) it is also possible to use alkoxylated fatty acids, eg. reaction products obtainable by addition of ethylene oxide and/or propylene oxide with or without butylene oxide to $C_8$-$C_{22}$-fatty acids. The fatty acids used are for example lauric acid, myristic acid, palmitic acid and stearic acid.

As component b) it is also possible to consider alkoxylated alkylphenols. Suitable alkylphenols contain for example from 1 to 12 carbon atoms in the alkyl group. Preferred representatives of these compounds are octylphenol and nonylphenol. The alkoxylation is carried out analogously to the preparation of the alkoxylated alcohols described above. Moreover, component b) may also be an alkoxylated alkylamine which has for example from 8 to 24 carbon atoms in the alkyl group.

The compounds of group b) are incorporated into the polyester in a proportion of from 0 to 50 mol %. If they are used in the cocondensation, their preferred proportion is from 5 to 35 mol %.

Polycondensates which contain one or more compounds of group b) can have various advantages By including a polyfunctional compound b) it is possible to obtain polyesters of higher molecular weight which are more effective at binding and dispersing alkaline earth metal salts. By including alkoxylated $C_8$-$C_{20}$-alcohols as cocondensed units it is possible to increase the compatibility of the polycondensates with liquid detergent formulations.

The compounds suitable for use as component c) are at least dibasic carboxylic acids which differ from the carboxylic acids mentioned under a). Suitable carboxylic acids contain no hydroxyl groups, nor any aromatic radicals. Saturated polybasic carboxylic acids of this kind and also carboxylic acids of this kind which contain an ethylenically unsaturated double bond in the molecule are for example succinic acid, maleic acid, fumaric acid, oxalic acid, adipic acid, aconitic acid, propane-1,2,3-tricarboxylic acid, butane-1,2,3-tricarboxylic acid, pentane-1,2,3-tricarboxylic acid, butane-1,2,3,4-tetracarboxylic acid, cyclopentane-1,2,3,4-tetracarboxylicacid,cyclohexane-1,2,3,4-tetracarboxylic acid, cyclohexane-1,2,3,5-tetracarboxylic acid and cyclohexane-1,2,4,5-tetracarboxylic acid. The preferred compounds c) are butanetetracarboxylic acid, cyclopentanetetracarboxylic acid and the isomers of cyclohexanetetracarboxylic acids. As is customary in the preparation of polyesters, the polybasic carboxylic acids mentioned as component c) can be used in the form of anhydrides, if they form anhydrides, or else as mono- or diesters of alcohols having from 1 to 4 carbon atoms. As compounds of component c) it is also possible to use acid chlorides. In the preparation of the polyesters, the compounds of group c) are used in an amount of from 0 to 90, preferably from 25 to 75, mol %.

The polyesters may be additionally modified by carrying out the condensation in the presence of monohydroxycarboxylic acids, such as lactic acid or glycolic acid. The compounds of component d) are used in an amount of from 0 to 90 mol %. If they are used, they are preferably used in amounts of from 10 to 60 mol %.

The preparation of the polyesters is preferably carried out in the presence of the customary catalysts. In the condensation of free polycarboxylic acids or of the anhydrides of these carboxylic acids the preferred catalyst is p-toluenesulfonic acid or sulfosuccinic acid. Other customary esterification catalysts are for example benzenesulfonic acid, polystyrenepolysulfonic acids, sulfuric acid and phosphoric acid. The catalysts are generally used in amounts of from 20 to 10,000, preferably from 50 to 5000, ppm, based on the components used in the condensation.

The condensation can be carried out in the presence of antioxidants, for example substituted phenols, eg. 2,5-di-tert-butylphenol, 2-methylcyclohexyl-4,6-dimethylphenol, 2,6-di-tert-butyl-4-methylphenol, pyrogallol, phosphorous acid or other antioxidants customarily used for this purpose. These compounds prevent discoloration of the polyesters due to oxidation during the condensation.

A preferred method of preparing the polyesters involves condensing the components in the melt in the absence of inert diluents at from 120° to 180° C. in the presence of customary catalysts. This process is employed in particular whenever compounds of component b) are used in the condensation, especially when these compounds are surfactants or polyalkylene oxides. If nonionic surfactants are to be added as component b), it is advantageous to add them later rather than earlier in order to avoid strong foaming in the first condensation phase. The compounds of component b) may also act as pure diluent in order to reduce the viscosity of the melt without, however, undergoing condensation to any significant degree themselves. For example, the surfactants can be added toward the end of the reaction and thus be incorporated into the reaction mass during the cooling down. Cocondensation of the compounds of component b) is substantially avoided if these compounds are not added to the melt until the melt has a viscosity (measured at 120° C.) of not less than 30,000 mPas. The use of nonionic surfactants of the type customary in detergents as diluents for the polyesters has the advantage of avoiding the introduction of components which are ineffective in detergents. However, the cocondensation of component b) can also be desirable, for example in order to increase the molecular weight of the condensates or to achieve compatibility with certain detergent formulations. The condensation in the melt can be carried out in customary polymerization apparatus equipped with stirrers or mixers. Preferably, however, the condensation in the melt is carried out in a kneader. Suitable for this purpose is for example an evacuable kneading reactor with a vertically or horizontally disposed shaft, an inert gas supply and a distillation unit. Other polymerization reactors with powerful mixing means are for example condensation-extrusion reactors, where the melt condensation takes place in a first reaction zone with the distillative removal of the water or alcohol formed in the course of the reaction and in a discharge zone the melt is extruded and converted into a finely divided reaction product. The melt condensation in the first reaction zone is preferably carried out under reduced pressure, for example at from 0.5 to 400 mbar.

However, the condensation can also be carried out in the presence of inert diluents. Suitable inert diluents are for example toluene, o-, m- and p-xylene, mesitylene, cumene, aliphatic hydrocarbons having boiling points of from 110° to 180° C., mixtures of the inert solvents mentioned and also polar aprotic solvents, such as ethylene glycol dimethyl ether, diethylene glycol dimethyl ether, dioxane and cyclohexanone. If low boiling solvents are used, the condensation reaction can be carried out under superatmospheric pressure, or mixtures of high boiling solvents are used, such as xylene or cumene together with dioxane or cyclohexanone.

The condensation may be carried out in the presence of protective colloids. This has the advantage that the condensate formed is readily suspendable and that the formation of a tough material which solidifies on cooling is prevented. Suitable protective colloids are . for example alkylated polyhydric $C_2$–$C_8$-alcohols, such as glycerol, oligoglycerol or pentaerythritol reacted with from 3 to 25 mol of ethylene oxide and/or propylene oxide. The protective colloids may additionally contain $C_6$–$C_{22}$-alkyl groups attached by ether, ester or amide bonds.

The amount of protective colloid is from 0.05 to 0.5% by weight, based on the polyester. If solvents are used, the concentration of solids, ie. polyester formed, in the inert diluent is from 10 to 70, preferably from 20 to 65, % by weight.

The novel polyesters are obtainable by condensing a) from 25 to 75 mol % of tartaric acid, tartaric anhydride or a mixture of tartaric acid or anhydride and citric acid in a molar ratio of from 100:1 to 0.2:1, preferably from 1:0.1 to 1:4 with b) from 0 to 50 mol % of a monohydric or polyhydric alcohol, a water-soluble $C_2$–$C_4$-alkylene glycol or a water-soluble addition product of a $C_2$- to $C_4$-alkylene oxide with a monohydric or polyhydric alcohol, a fatty acid, an alkylphenol or an alkylamine, and c) from 75 to 25 mol % of butanetetracarboxylic acid, cyclopentanetetracarboxylic acid, cyclohexanetetracarboxylic acid, butanetetracarboxylic anhydride, cyclopentanetetracarboxylic anhydride, cyclohexanetetracarboxylic anhydride or a mixture thereof, at from 120° to 180° C. in the presence of a customary esterification catalyst up to a K value of from 7 to 80 (determined by the method of H. Fikentscher on 2% aqueous solutions of polyester at 25° C. and pH 7). The polyesters can be modified by using component a) for the condensation which additionally contains up to 60 mol % of malic acid.

The above-described polyesters, which either consist of compounds of component a) alone or in addition to component a) contain as cocondensed units compounds of component b) and/or c) with or without compounds of component d), have K values of from 7 to 80, preferably from 8 to 50 (determined by the method of H. Fikentscher in 2% aqueous solution at 25° C. and pH 7). Immediately following condensation, the polyesters are present in the acid form. They can be converted into the salt form by addition of bases. Suitable bases are for example sodium hydroxide, potassium hydroxide, lithium hydroxide, calcium hydroxide, sodium carbonate, potassium carbonate, lithium carbonate, calcium carbonate, ammonium carbonate, ammonium bicarbonate, ammonia, ethanolamine, diethanolamine or triethanolamine. The bases are preferably used in the form of aqueous solutions. Of the bases mentioned, sodium hydroxide, sodium carbonate and sodium bicarbonate are preferred. The polyesters are neutralized to such an extent that the aqueous solutions of the neutralized or partially neutralized polyesters have pH values within the range from 5 to 9, preferably from 6 to 8. The polyesters to be used according to the present invention have acid numbers of about 90–780, preferably 265–740, mg of KOH/g of polyester.

To be able to store the polyesters without alteration, they are isolated after the at least partial neutralization from the aqueous solution, preferably in the form of the neutral sodium salt. There are various customary methods for doing this, such as freeze drying, spray drying or fluidized bed drying. The drying can be effected with or without the addition of detergent-active substances. For instance, by fluidized bed drying of mixtures with anionic surfactants, polymeric detergent additives, builders or diluents it is possible to prepare a granular product which contains the polyesters to be used according to the present invention. This form of formulation can be of decisive advantage for use of the polyesters in alkaline or acid detergents.

The above-described polyesters are used as additives in pulverulent and liquid detergents, preferably in phosphate-free or low-phosphate detergents which contain not more than 25% by weight of sodium triphosphate. The polyesters are used in amounts of from 0.1 to 30, preferably from 0.5 to 15, % by weight, based on the detergent formulation. The polyesters to be used according to the present invention are good dispersants for clay in the washing liquor. This property is important because loamy soiling of textile material is very common. The polyesters act as builders in detergent formulations, augment the detergency of the surfactants in detergents and also bring about during the wash a reduction in the incrustation of the washed textile material and make a significant contribution to the dispersal of soil in the washing liquor. Compared with known polymeric builders, the polyesters to be used according to the present invention have the advantage of being highly biodegradable, reaching for example degradation rates of above 90%. Compared with the copolymers of maleic acid and acrylic acid described for use as detergent additive in EP-B-0 025 551, the polyesters to be used according to the present invention show in particular improved compatibility in liquid detergent formulations. Cocondensates of citric acid and tartaric acid are preferable to tartaric acid homocondensates. They combine similar dispersing power for clay with greater effectiveness in incrustation inhibition and calcium carbonate dispersal. In addition, they are better in promoting the detachment of clay from fabric.

The compositions of detergent formulations used for washing can differ greatly. The same is true of those used as cleaners. Both washing and cleaning detergent formulations customarily contain surfactants with or without builders This is true not only of liquid but also of pulverulent washing and cleaning detergent formulations. Examples of the compositions of washing detergent formulations customary in Europe, the USA and Japan may be found for example in table form in Chemical and Engineering News 67 (1989), 35.

The above-described polyesters are used according to the invention in detergents which contain up to 45% by weight of phosphate, although their use in detergents having a reduced phosphate content (which is to be understood as meaning a phosphate content of less than 25% by weight of sodium triphosphate) or in phosphate-free detergents is preferred. The polyesters can be added to the detergent formulation in the form of granules, in the form of pastes, as a highly viscous mass, as a dispersion or as a solution in a solvent. The polyesters can also be adsorbed on the surface of diluents, for example sodium sulfate, or builders (zeolites or bentonites) and also on other solid constituents of the detergent formulation.

The detergent formulations in question are pulverulent or liquid. They can differ in composition by region and according to the specific intended use.

Universal household detergents for drum type washing machines of the type widely used in Europe usually contain from 5 to 10% by weight of anionic surfactants, from 1 to 5% by weight of nonionic surfactants, from 1 to 5% by weight of foam regulators, such as silicone oils or soaps, from 0 to 40% by weight of a water softener, such as sodium carbonate or pentasodium triphosphate, which may be replaced in whole or in part by the compounds of the present invention, from 0 to 30% by weight of an ion exchanger such as zeolite A, from 2 to 7% by weight of sodium silicates as corrosion inhibitors, from 10 to 30% by weight of bleaching agents, such as sodium perborate or sodium percarbonate, organic per-acids and salts thereof, from 0 to 5% by weight of bleach activators, such as tetraacetylethylenediamine, pentaacetylglucose, hexaacetylsorbitol or acyloxybenzenesulfonate, stabilizers, such as magnesium silicate or ethylenediaminetetraacetate, grayness inhibitors, such as carboxymethylcellulose, methylalkylcelluloses and hydroxyalkylcelluloses, vinyl acetate-grafted polyglycols, oligomeric and polymeric terephthalic acid/ethylene glycol/polyethylene glycol esters, enzymes, fluorescent whitening agents, scents, fabric softeners, dyes, and diluents.

By contrast, the heavy duty detergents which are used in the USA, Japan and neighboring countries in tub type washing machines are usually free of bleaching agents, but on the other hand their anionics content is two to three times higher and they contain more wash alkalis, such as sodium carbonate and sodium silicates (in general up to 25% by weight) and mostly they also lack the bleach activators and bleach stabilizers. The levels of surfactants and other ingredients can be appreciably higher in the case of detergent concentrates, which are available with little or no diluent. Detergents for delicate and colored fabrics, wool detergents and handwashing detergents likewise usually contain no bleaching agents and only low levels of alkaline ingredients together with a correspondingly higher surfactant content.

Detergents for the commercial laundry sector are designed for the special conditions of industrial washing (soft water, continuous washing) which make it possible to customize the detergent to the type of article being washed and to the nature of the soil. Combinations are therefore used in which one ingredient predominates or others are completely absent only to be added separately when required. For this reason the surfactants, builders, alkalis and bleaching agents of these detergents vary within wide limits.

Suitable anionic surfactants for the aforementioned pulverulent washing detergents, or washing powders, are for example sodium alkylbenzenesulfonates, fatty alcohol sulfates and fatty alcohol polyglycol ether sulfates. Individual compounds of this type are for example $C_8$–$C_{12}$-alkylbenzenesulfonates, $C_{12}$–$C_{16}$-alkanesulfonates, $C_{12}$–$C_{16}$-alkyl sulfates, $C_{12}$–$C_{16}$-alkyl sulfosuccinates and sulfated ethoxylated $C_{12}$–$C_{16}$-alkanols. Other suitable anionic surfactants are sulfated fatty acid alkanolamines, $\alpha$-sulfo fatty acid esters, fatty acid monoglycerides or reaction products of from 1 to 4 mol of ethylene oxide with primary or secondary fatty alcohols or alkylphenols. Further suitable anionic surfactants are fatty acid esters and fatty acid amides of hydroxy- or amino-carboxylic or -sulfonic acids, for example the fatty acid sarcosides, glycolates, lactates, taurides or isethionates. The anionic surfactants can be present in the form of the sodium, potassium and ammonium salts and also as soluble salts of organic bases, such as mono-, di- or triethanolamine or other substituted amines. The group of anionic surfactants also includes the ordinary soaps, ie. the alkali metal salts of natural fatty acids.

Suitable nonionic surfactants (nonionics) are for example addition products of from 3 to 40, preferably from 4 to 20, mol of ethylene oxide with 1 mol of fatty alcohol, alkylphenol, fatty acid, fatty amine, fatty acid amide or alkanesulfonamide. The abovementioned addition products of ethylene oxide may additionally contain up to 90 % by weight, based on cocondensed ethylene oxide and propylene oxide, of propylene oxide as cocondensed units. The addition products which contain ethylene oxide and propylene oxide as cocondensed units may be modified by incorporation of butylene oxide as cocondensed units in amounts of up to 60 % by weight, based on the total alkylene oxide content. Of particular importance are the addition products of from 5 to 16 mol of ethylene oxide with coconut or tallow fatty alcohols, with oleyl alcohol or with synthetic alcohols of from 8 to 18, preferably from 12 to 18, carbon atoms, and also with mono- or dialkylphenols having from 6 to 14 carbon atoms in the alkyl moieties. Besides these water-soluble nonionics, however, it is also possible to use water-insoluble or incompletely water-soluble polyglycol ethers having from . 1 to 4 ethylene glycol ether moieties in the molecule, in particular if they are used together with water-soluble nonionic or anionic surfactants.

Further usable nonionic surfactants are the water-soluble addition products of ethylene oxide with polypropylene glycol ethers, alkylenediaminopolypropylene glycol and alkylpolypropylene glycols having 1 to 10 carbon atoms in the alkyl chain that contain from 20 to 250 ethylene glycol ether groups and from 10 to 100 propylene glycol ether groups, the polypropylene glycol ether chain acting as hydrophobe.

It is also possible to use nonionic surfactants of the type of the amine oxides or sulfoxides.

The foaming power of the surfactants can be increased or reduced by combining suitable surfactant types. A reduction can also be achieved by adding non-surfactant-like organic substances.

Further possible formulation ingredients of detergents include monomeric, oligomeric and polymeric phosphonates, ether sulfonates based on unsaturated fatty alcohols, eg. oleyl alcohol ethoxylate butyl ether and alkali metal salts thereof. These substances can be characterized for example with the aid of the formula RO(CH$_2$CH$_2$O)$_n$-C$_4$H$_8$-SO$_3$Na, where n is from 5 to 40 and R is oleyl.

The above-described polyesters can also be used as additives in liquid washing detergents. Polyesters preferably used in liquid washing detergents contain as component b) alkoxylated mono- or polyhydric alcohols as cocondensed units. Liquid detergents contain liquid surfactants or else solid surfactants which are soluble or at least dispersible in the detergent formulation. Suitable surfactants for this purpose are those products which are also used in pulverulent detergents but also liquid polyalkylene oxides or polyalkoxylated compounds. If the polyesters are not directly miscible with the other constituents of the liquid detergent, it is possible to prepare homogeneous mixtures with the aid of a small amount of a solubilizer, for example water or a water-miscible organic solvent, eg. isopropanol, methanol, ethanol, glycol, diethylene glycol or triethylene glycol or corresponding propylene glycols. The amount of surfactant in liquid detergents is within the range from 4 to 50% by weight, based on the formulation as a whole, since in liquid detergents, too, the proportions of the ingredients vary within wide limits according to regional market conditions or the intended application.

Liquid detergents may contain water in amounts of from 10 to 60, preferably from 20 to 50, % by weight. However, they can also be free of water.

Water-free liquid detergents may also contain suspended or dispersed peroxo compounds for bleaching. Examples of suitable peroxo compounds are sodium perborate, peroxocarboxylic acids and polymers having some peroxo-containing groups. Liquid detergents may also contain hydrotropes. These are compounds such as 1,2-propanediol, cumenesulfonate and toluenesulfonate. If such compounds are used for modifying a liquid detergent, their amount is from 2 to 5% by weight, based on the total weight of the liquid detergent. In many cases an addition of complexing agents has also proved advantageous for modifying pulverulent and liquid detergents. Complexing agents are for example ethylenediaminetetraacetic acid, nitrilotriacetate and isoserinediacetic acid and also phosphonates, such as aminotrismethylenephosphonic acid, hydroxyethanediphosphonic acid, ethylenediaminetetraethylenephosphonic acid and salts thereof. Complexing agents are used in amounts of from 0 to 10% by weight, based on the detergent. The detergents may also contain citrates, di- or triethanolamine, or opacifiers, fluorescent whitening agents, enzymes, perfume oils and dyes. These substances, if they are used for modifying a liquid detergent, together account for up to 5% by weight. The detergents are preferably phosphate-free. . However, they may also contain phosphates, for example pentasodium triphosphate and/or tetrapotassium pyrophosphate. If phosphates are used, they account for up to 45, preferably up to 25, % by weight of the total formulation of the detergent.

The polyesters to be used according to the present invention can also interact with other known detergent additives (for example grayness inhibitors, clay dispersants and substances which augment the primary detergency, color transfer inhibitors, bleach activators) in pulverulent and liquid detergents (phosphate-containing and phosphate-free) to produce synergistic effects enhancing not only the dispersal of particulate soil but also the effectiveness of the other detergent additive.

The percentages in the Examples are by weight. The K values of the polyesters were determined by the method of H. Fikentscher, Cellulosechemie 13 (1932), 58–64, 71–74, in aqueous 2% by weight solution of the sodium salt of the polyester at 25° C. and pH 7.

EXAMPLES

Preparation of polyesters

General method of preparation I

The amounts of compounds of components a) to c) stated in Table 1 are introduced together with the catalyst into a 2 l three-neck flask equipped with gas inlet means, internal thermometer, stirrer and distillation bridge. The contents are purged with nitrogen for 30 minutes and then heated to 140° C. with stirring. They melt. As soon as the temperature is higher than 100° C., water is distilled out of the mixture. After the reaction mixture has been heated at 140° C. for 30 minutes, the pressure is reduced to about 400 mbar. The condensation is continued until the desired amount of water has been distilled off. In each case a viscous melt is obtained, which solidifies on cooling down or, after dilution with a compound of component b), is converted into a viscous melt suitable for further processing. The sodium salts of the polyesters are prepared by comminuting the condensates obtained in the polycondensation, dispersing in water at room temperature and neutralizing with aqueous sodium carbonate solution until the solution pH is 7. The neutralized polyesters had the K values reported in Table 1.

The key to the abbreviations used below is as follows:

| TA: | tartaric acid |
| CA: | citric acid |
| BTCA: | butane-1,2,3,4-tetracarboxylic acid |
| BTCB: | butane-1,2,3,4-tetracarboxylic bisanhydride |
| SA: | succinic anhydride |
| CPTB: | cyclopentane-1,2,3,4-tetracarboxylic bisanhydride |
| ADPCl: | adipoyl dichloride |
| OxCl: | oxalyl dichloride |
| MA: | malic acid |
| $EO_{34}$: | polyethylene glycol having an average degree of polymerization $\overline{DP} = 34$ |
| $C_{15/17}EO_7$: | addition product of 7 mol of ethylene oxide with 1 mol of linear $C_{15}/C_{17}$-alcohol |
| Gly: | glycerol |
| CON: | cyclohexanone |
| DXN: | dioxane |
| DGDM: | diethylene glycol dimethyl ether |
| MES: | mesitylene |
| pTS: | para-toluenesulfonic acid monohydrate |

TABLE 1

| Polyester No. | Starting materials a) | [mol] | b) | [mol] | c) | [mol] | pTS [mmol] | Reaction time [h] | Reaction temp. [°C.] | K value |
| --- | --- | --- | --- | --- | --- | --- | --- | --- | --- | --- |
| 1 | TA | 1.5 | — | | — | | 0.016 | 5.5 | 145 | 11.4 |
|   | CA | 1.5 | | | | | | | | |
| 2 | TA | 1.5 | $C_{15/17}EO_7$ | 0.15[1)] | — | | 0.016 | 5.5 | 145 | 12.4 |
|   | CA | 1.5 | | | | | | | | |
| 3 | TA | 1.5 | $C_{15/17}EO_7$ | 0.5[1)] | — | | 0.016 | 5.5 | 145 | 13.2 |
|   | CA | 1.5 | | | | | | | | |
| 4 | TA | 1.0 | $EO_{15}$ | 0.25[1)] | — | | 0.015 | 5.0 | 140 | 13.9 |
|   | CA | 2.0 | | | | | | | | |
| 5 | TA | 1.0 | — | | SA | 1.0 | 0.015 | 7.5 | 140 | 8.9 |
| 6 | TA | 1.0 | $C_{15/17}EO_7$ | 0.5 | BTCA | 1.0 | 0.019 | 5.5 | 130 | 14.0 |
| 7 | TA | 0.5 | $EO_{34}$ | 0.25 | BTCA | 0.75 | 0.012 | 5.5 | 130 | 19.5 |

[1)]Addition at end of condensation phase following pressure equilization with the inert gas

General method of preparation II

The amounts of components a) to c) stated in Table 2 are introduced together with the similarly stated amount of p-toluenesulfonic acid and the particular solvent used into a 2 l three-neck flask equipped with gas inlet means, internal thermometer, stirrer and distillation bridge, then nitrogen is passed through for 30 minutes, and the contents are heated to the particular temperature stated in the Table, causing the reaction components or products to dissolve partially or completely and the solution to become viscous in the course of the reaction. The reaction mixture is maintained at the reaction temperature for the time mentioned in the Table and then worked up by distilling off the solvent under reduced pressure at from 10 to 0.1 mbar. The sodium salts of the polyesters are obtained by comminuting the condensates, dispersing in water at room temperature and neutralizing with aqueous sodium carbonate solution to pH 7. The products have the K values reported in Table 2.

TABLE 2

| Polyester No. | Starting materials a) | [mol] | b) | [mol] | c) | [mol] | pTS [mmol] | Solvent | [g] | Reaction time [h] | Reaction temp. [°C.] | K value |
| --- | --- | --- | --- | --- | --- | --- | --- | --- | --- | --- | --- | --- |
| 8 | TA | 0.45 | — | | BTCB | 0.45 | 4.21 | CON | 120 | 7.0 | 140 | 11.5 |
| 9 | TA | 0.1 | Gly | 0.1 | CPTB | 0.2 | 1.74 | DXN | 55 | 8.0 | 100 | 10.3 |
| 10 | TA | 0.2 | — | | BTCB | 0.2 | 1.83 | DXN | 55 | 24.0 | 100 | 7.9 |
| 11 | TA | 0.2 | — | | CPTB | 0.2 | — | DGDM | 55 | 8.0 | 145 | 8.5 |
| 12 | TA | 0.25 | — | | ADPCl | 0.25[2)] | — | DXN | 77 | 3.5 | 50/80[1)] | 10.2 |
| 13 | TA | 0.25 | — | | OxCl | 0.25[2)] | — | DXN | 77 | 3.5 | 50/80[1)] | 11.2 |

[1)]1.5 h at 50° C., 2 h at 80° C.
[2)]Addition within 30 min.

General method of preparation III

A 2 l capacity three-neck flask equipped with gas inlet means, internal thermometer, stirrer and water separator is charged with the amounts of components a) to c) indicated in Table 3, the solvent and 0.72 g of the protective colloid specified hereinafter and purged with nitrogen for 30 minutes. The contents are then heated to the stated reaction temperature, causing the starting materials to dissolve to some extent but predominantly remain suspended in the solid or molten state. The water formed in the course of the condensation is separated off in the water separator by azeotropic distillation. The condensation is carried on to the desired amount of distillate. The polyester is then worked up by decanting off the solvent after cooling down, dispersing the residue in water and neutralizing to pH 7 with aqueous sodium carbonate solution. Then 100 ml of the azeotrope of water and the remaining solvent are distilled off at 50° C.

The protective colloid was prepared by reacting oleyl alcohol with epichlorohydrin in a molar ratio of 1:1 to give oleyl glycidyl ether, which was further reacted with glycerol in a molar ratio of 1:1 in the presence of BF3-phosphoric acid at 80° C. After the catalyst had been removed with the aid of a basic ion exchanger, the reaction product was ethoxylated with 2 mol of ethylene oxide.

anionic dispersants is due to the fact that, as a consequence of the adsorption of dispersant molecules on the surfaces of the solids, the surface charge thereof and hence the repulsion increases. Further factors having a bearing on the stability of a dispersion include steric effects, the temperature, the pH and the electrolyte concentration.

The clay dispersion (CD) test described hereinafter can be used to assess the dispersing power of various polyelectrolytes in a simple manner.

TABLE 3

| Polyester No. | a) | [mol] | b) | [mol] | c) | [mol] | pTS [mmol] | Solvent | [g] | Reaction time [h] | Reaction temp. [°C.] | K value |
|---|---|---|---|---|---|---|---|---|---|---|---|---|
| 14 | TA | 0.5 | — | | BTCA | 0.5 | 0.51 | xylene | 300 | 7.0 | 140 | 11.5 |
| 15 | TA | 1.0 | — | | BTCA | 0.5 | 0.70 | xylene | 300 | 8.0 | 138 | 9.5 |
| 16 | TA CA | 1.0 1.0 | — | | — | | 0.53 | xylene | 300 | 6.5 | 138 | 8.6 |
| 17 | TA CA | 1.0 1.0 | — | | — | | 0.53 | xylene | 300 | 9.0 | 138 | 8.8 |
| 18 | TA CA | 0.5 1.0 | — | | — | | 0.74 | xylene | 300 | 6.0 | 138 | 10.5 |
| 19 | MA | 1.5 | — | | — | | 0.53 | xylene | 300 | 4.0 | 138 | 8.9 |
| 20 | TA | 0.5 | — | | — | | 0.20 | MES | 300 | 6.0 | 170 | 8.9 |
| 21 | TA | 0.5 | EO$_{34}$ | 0.25 | BTCA | 0.75 | 0.20 | xylene | 300 | 6.0 | 138 | 18.4 |
| 22 | TA | 0.5 | C$_{15/17}$EO$_7$ | 0.5 | BTCA | 1.0 | 0.20 | xylene | 300 | 6.0 | 138 | 15.2 |

General method of preparation IV

A 2 l capacity kneader reactor with a horizontally disposed mixer shaft, equipped with a vacuum distillation unit and a thermocouple, is charged with the amounts of components a) to c) indicated in Table 4 together with the particular amount of p-toluenesulfonic acid stated, and purged with nitrogen for 30 minutes. Then the reactor is heated, while the mixer shaft is running, to an internal temperature of 140° C. and the pressure is reduced to 300 mbar. The reactor contents melt and water distils off. After a reaction time of 30 minutes, the pressure is reduced to 100 mbar and the condensation is carried on until the desired amount of water has been distilled off. In each case a viscous melt of the polyester is obtained. These melts may be diluted if necessary with component b) to reduce the viscosity of the melt. Depending on the dilution ratio and the degree of cooling, the melts solidify. They can be comminuted by means of the kneader mechanics or be discharged from the reactor in the form of the dilute melt. To neutralize the polyesters, the condensates are comminuted, dispersed in water at room temperature and adjusted to pH 7 with aqueous sodium carbonate solution. The polyesters have the K values reported in Table 4.

CD test

Particulate soil is represented by finely ground china clay SPS 151. 1 g of clay is intensively dispersed in 98 ml of water in a 100 ml cylinder in the presence of 1 ml of a 0.1% strength sodium salt solution of the polyelectrolyte for 10 minutes. Immediately after the stirring has been stopped, a sample of 2.5 ml is removed from the center of the cylinder and diluted to 25 ml and the turbidity measured in a turbidimeter. After the dispersion has stood for 30 and 60 minutes, further samples are taken and again measured in the turbidimeter. The turbidity of the dispersion is reported in nephelometric turbidity units (NTUs). The less the dispersion settles on storage, the higher the measured turbidity values are and the stabler the dispersion is. The second physical parameter determined is the dispersion constant $\tau$, which describes the time course of the sedimentation process. Since the sedimentation process approximates to a monoexponential time law, $\tau$ indicates the time within which the turbidity decreases to 1/e-th of the original level at time t=0.

TABLE 4

| Polyester No. | a) | [mol] | b) | [mol] | pTS [mmol] | Reaction time [h] | Reaction temp. [°C.] | K value |
|---|---|---|---|---|---|---|---|---|
| 23 | TA CA | 1.5 1.5 | — | | 1.42 | 6.0 | 120–145 | 15.1 |
| 24 | TA CA | 3.0 3.0 | EO$_{34}$ | 0.25 | 2.84 | 5.0 | 120–145 | 32.3 |
| 25 | TA CA | 1.5 1.5 | C$_{15/17}$EO$_7$ | 0.81 | 1.42 | 3.5 | 120–145 | 12.9 |
| 26 | TA CA | 1.0 2.0 | EO$_{34}$ | 0.25 | 1.50 | 3.5 | 120–145 | 28.0 |

APPLICATION EXAMPLES

Clay dispersion

The removal of particulate soil from fabric surfaces is augmented by the presence of polyelectrolytes. Stabilizing the dispersion which forms as the particles are detached from the fabric surface is an important function of these polyelectrolytes. The stabilizing effect of the The higher the value of $\tau$, the slower the rate of sedimentation in the dispersion.

| Example | Polyester No. | Turbidity after storage [NTUs] at once | 30 min | 60 min | Dispersion constant τ [min] |
|---|---|---|---|---|---|
| 1 | 8 | 700 | 625 | 545 | 242.6 |
| 2 | 9 | 640 | 360 | 350 | 436.4 |
| 3 | 10 | 710 | 630 | 580 | 304.9 |
| 4 | 11 | 750 | 600 | 540 | 203.1 |
| 5 | 12 | 650 | 500 | 420 | 140.3 |
| 6 | 13 | 750 | 600 | 510 | 157.4 |
| 7 | 14 | 750 | 690 | 580 | 268.1 |
| 8 | 15 | 640 | 600 | 470 | 405.2 |
| 9 | 16 | 820 | 790 | 610 | 460.3 |
| 10 | 17 | 750 | 650 | 500 | 164.3 |
| 11 | 18 | 630 | 600 | 520 | 412.1 |
| 12 | 19 | 660 | 570 | 450 | 167.6 |
| 13 | 20 | 680 | 610 | 520 | 233.4 |
| Comparative Example | | | | | |
| 1 | no addition | 600 | 37 | 33 | 41.4 |
| 2 | tartaric acid | 560 | 90 | 70 | 35.3 |
| 3 | copolymer of 70% acrylic acid and 30% maleic acid of K value 60[1] | 640 | 470 | 380 | 97.9 |

The measured values reveal that the polyesters to be used according to the present invention give dispersions which, after a standing time of 60 minutes, have distinctly higher turbidity values (NTUs) than the reported comparisons. This means, together with the distinctly higher dispersion constants, that the polyesters to be used according to the present invention are better dispersants of clay and also make possible the preparation of dispersions having an improved storage life.

The biodegradability of the above-described polyesters was investigated in a modified Zahn-Wellens test in accordance with DIN 38 412, Part 24 static test (L25). The following degradation values were found for example:

| Polyester No. | Biodegradation [%] within 28 days |
|---|---|
| 8 | >90% |
| 14 | >95% |
| 15 | >92% |
| 16 | >95% (in only 14 days) |
| 23 | >94% |

We claim:

1. A process for preparing a water-soluble or water dispersible polyester, which comprises reacting
   a) a mixture of tartaric acid or anhydride and citric acid in a molar ratio of from 1:0.1 to 1:4 or such a mixture which additionally contains up to 60 mol % of malic acid with - based on 1 mol of component a)
   b) from 0 to 50 mol % of a monohydric or polyhydric alcohol, a water-soluble poly-$C_2$-$C_4$-alkylene glycol or a water-soluble addition product of a $C_2$-$C_4$-alkylene oxide with a monohydric or polyhydric alcohol, a fatty acid, an alkylphenol or an alkylamine, or
   c) from 0 to 90 mol % of a carboxylic acid which contains at least two carboxyl groups and which is different from the carboxylic acids mentioned under a), and also
   d) from 0 to 90 mol % of lactic acid, glycolic acid or a mixture thereof
in the melt in the absence of an inert diluent at from 120° to 180° C. in the presence of a customary esterification catalyst and distilling off the water formed in the course of the condensation.

2. A process as claimed in claim 1, wherein the reaction is carried out in an inert diluent.

3. A process as claimed in claim 1, wherein the reaction is carried out in a kneader and the water formed in the course of the condensation is distilled off under reduced pressure.

4. A process as claimed in claim 1, wherein component b) is not added to the melt until the viscosity thereof (measured at 120° C.) is not less than 30,000 mPas.

5. A polyester obtainable by condensing.
   a) from 25 to 75 mol % of tartaric acid, tartaric anhydride or a mixture of tartaric acid or anhydride and citric acid in a molar ratio of from 1:0.1 to 1:4 with
   b) from 0 to 50 mol % of a monohydric or polyhydric alcohol, a water-soluble poly-$C_2$-$C_4$-alkylene glycol or a water-soluble addition product of a $C_2$- to $C_4$-alkylene oxide with a monohydric or polyhydric alcohol, a fatty acid, an alkylphenol or an alkylamine, and
   c) from 75 to 25 mol % of butanetetracarboxylic acid, cyclopentanetetracarboxylic acid, cyclohexanetetracarboxylic acid, butanetetracarboxylic anhydride, cyclopentanetetracarboxylic anhydride, cyclohexanetetracarboxylic anhydride or a mixture thereof,
at from 120° to 180° C. in the presence of a customary esterification catalyst up to a K value of from 7 to 80 (determined by the method of H. Fikentscher on 2% aqueous solutions of polyester at 25° C. and pH 7).

6. A polyester as claimed in claim 5, wherein the component a) used in the condensation additionally contains up to 60 mol % of malic acid.

7. A detergent composition which contains at least one surfactant, containing as further constituent a water-soluble or water-dispersible polyester obtainable by condensation of tartaric acid or anhydride alone or by condensation of a mixture of tartaric acid or anhydride and citric acid in a molar ratio of from 1:0.1 to 1:4.

8. A detergent composition as claimed in claim 7, wherein the polyester is obtainable by condensation of additionally up to 60 mol % of malic acid.

9. A detergent composition as claimed in claim 7, wherein the polyester is obtainable by condensing
   a) a mixture of tartaric acid or anhydride and citric acid in a molar ratio of from 1:0.1 to 1:4 or such a mixture which additionally contains up to 60 mol % of malic acid with - based on 1 mol of component a)
   b) from 0 to 50 mol % of a monohydric or polyhydric alcohol, a water-soluble poly-$C_2$-$C_4$-alkylene glycol or a water-soluble addition product of a $C_2$-$C_4$-alkylene oxide with a monohydric or polyhydric alcohol, a fatty acid, an alkylphenol or an alkylamine, or
   c) from 0 to 90 mol % of a carboxylic acid which contains at least two carboxyl groups and which is different from the carboxylic acids mentioned under a), and also
   d) from 0 to 90 mol % of lactic acid, glycolic acid or a mixture thereof
in the presence of a customary esterification catalyst.

10. A detergent composition as claimed in claim 7, wherein the polyester is obtainable by condensing
a) from 25 to 75 mol % of tartaric acid, tartaric anhydride or a mixture of tartaric acid or anhydride and citric acid in a molar ratio of from 1:0.1 to 1:4 with
b) from 0 to 50 mol % of a monohydric or polyhydric alcohol, a water-soluble poly-$C_2$–$C_4$-alkylene glycol or a water-soluble addition product of a $C_2$- to $C_4$-alkylene oxide with a monohydric or polyhydric alcohol, a fatty acid, an alkylphenol or an alkylamine, and
c) from 75 to 25 mol % of butanetetracarboxylic acid, cyclopentanetetracarboxylic acid, cyclohexanetetracarboxylic acid, butanetetracarboxylic anhydride, cyclopentanetetracarboxylic anhydride, cyclohexanetetracarboxylic anhydride or a mixture thereof, at from 120° to 180° C. in the presence of a customary esterification catalyst up to a K value of from 7 to 80 (determined by the method of H. Fikentscher on 2% aqueous solutions of polyester at 25° C. and pH 7).

11. A detergent composition as claimed in claim 7, containing the polyester in an amount of from 0.1 to 30% by weight.

* * * * *